(12) United States Patent
Liau et al.

(10) Patent No.: US 11,554,699 B2
(45) Date of Patent: Jan. 17, 2023

(54) FIBROUS FOAM ARCHITECTURE

(71) Applicant: TESLA, INC., Palo Alto, CA (US)

(72) Inventors: Forrest Wen Liau, Palo Alto, CA (US); Stefan Kuzmanovski, San Francisco, CA (US); Jorge C. Fialho, San Jose, CA (US); Andrea Piana, Atlanta, GA (US); Eric McCann, Kennesaw, GA (US); Mehran Jafari, Kennesaw, GA (US); Andy Hollis, White, GA (US); Helias Andriessen, Smyrna, GA (US)

(73) Assignees: Tesla, Inc., Austin, TX (US); PIANA NONWOVENS. LLC, Cartersville, GA (US)

( * ) Notice: Subject to any disclaimer, the term of this patent is extended or adjusted under 35 U.S.C. 154(b) by 236 days.

(21) Appl. No.: 16/404,852

(22) Filed: May 7, 2019

(65) Prior Publication Data
US 2019/0344691 A1 Nov. 14, 2019

Related U.S. Application Data

(60) Provisional application No. 62/668,502, filed on May 8, 2018.

(51) Int. Cl.
*B60N 2/58* (2006.01)
*B29C 43/18* (2006.01)
(Continued)

(52) U.S. Cl.
CPC ............ *B60N 2/5891* (2013.01); *A47C 7/24* (2013.01); *A47C 7/72* (2013.01); *A47C 7/748* (2013.01); *A47C 31/023* (2013.01); *B29C 43/003* (2013.01); *B29C 43/18* (2013.01); *B29C 43/203* (2013.01); *B29C 43/52* (2013.01); *B60N 2/56* (2013.01); *B60N 2/5825* (2013.01); *B60N 2/5866* (2013.01); *B68G 7/02* (2013.01); *B68G 7/05* (2013.01); *B29K 2067/00* (2013.01); *B29K 2077/00* (2013.01); *B29K 2105/0085* (2013.01); *B29K 2105/256* (2013.01); *B29L 2031/3041* (2013.01)

(58) Field of Classification Search
CPC .... A47C 7/24; A47C 7/72; A47C 7/48; A47C 31/023; B60N 2/56; B60N 2/5825; B60N 2/5891; B68G 7/02; B68G 7/05; B29C 43/003; B29C 43/18
USPC .................................... 297/452.27, 180, 12
See application file for complete search history.

(56) References Cited

U.S. PATENT DOCUMENTS 4,132,228 A * 1/1979 Green ................... A47C 7/029
601/57
5,762,842 A * 6/1998 Burchi ................. B60N 2/5891
264/276

(Continued)

FOREIGN PATENT DOCUMENTS

EP            1371774 A2  * 12/2003
WO    WO-2018159729 A1  *  9/2018  ............. B32B 5/022

*Primary Examiner* — Anthony D Barfield
(74) *Attorney, Agent, or Firm* — Knobbe, Martens, Olson & Bear, LLP

(57) ABSTRACT

A cushion having a fibrous foam architecture. The cushion has a trim cover and a number of fibrous layers attached to the trim cover. One or more structural properties of a fibrous layer can be controlled to differ from that of other layers.

20 Claims, 18 Drawing Sheets

(51) Int. Cl.
| | |
|---|---|
| *B29C 43/20* | (2006.01) |
| *B29C 43/52* | (2006.01) |
| *A47C 31/02* | (2006.01) |
| *A47C 7/74* | (2006.01) |
| *A47C 7/72* | (2006.01) |
| *A47C 7/24* | (2006.01) |
| *B68G 7/05* | (2006.01) |
| *B68G 7/02* | (2006.01) |
| *B60N 2/56* | (2006.01) |
| *B29C 43/00* | (2006.01) |
| *B29K 105/00* | (2006.01) |
| *B29K 67/00* | (2006.01) |
| *B29K 77/00* | (2006.01) |
| *B29L 31/30* | (2006.01) |

(56) References Cited

U.S. PATENT DOCUMENTS

| | | | |
|---|---|---|---|
| 7,677,660 B2* | 3/2010 | Galbreath | 297/217.1 |
| 2013/0200661 A1* | 8/2013 | Klusmeier | 297/180.12 |
| 2015/0360597 A1* | 12/2015 | Galbreath | 297/452.38 |

* cited by examiner

FIBROUS FOAM ARCHITECTURE

CROSS-REFERENCE TO RELATED APPLICATIONS

The present U.S. Utility Patent Application claims priority pursuant to 35 U.S.C. § 119(e) to U.S. Provisional Application No. 62/668,502, entitled "FIBROUS FOAM ARCHITECTURE", filed May 8, 2018, which is hereby incorporated herein by reference in its entirety and made part of the present U.S. Utility Patent Application for all purposes.

TECHNICAL FIELD

The present disclosure relates to a fibrous foam architecture. More particularly, the present disclosure relates to a fibrous foam architecture for cushions that may be incorporated into vehicle seating.

BACKGROUND

Cushions are used for seating in automotive and other applications. Current cushion materials include foam made of polyurethane. Such material may not have recycled content and may not be breathable. The foam fabrication process may involve pouring polymer, epoxy, or another precursor into a mold or soft trim cavity. Further, cutting waste material off and glue application may also be required. This may be a time-consuming and laborious process. Trim to foam assembly may include hog ring, hook and loop, and/or clipping methods. In such methods, alignment tolerances may need to be maintained, mating surface limitations may need to be met, trenches and stitches may need to be provided and so on. Glue application storage and handling may also be required. Current manufacturing processes may be labor-intensive and time consuming.

Hence, there is a need for an improved foam architecture and associated manufacturing process that overcome the aforementioned drawbacks.

SUMMARY

The present disclosure introduces a cushion having a fibrous foam architecture. The cushion may support a seating surface including seat bottom, backrest, leg-rest, head-rest, armrest, and bolsters. The cushion has a trim cover and fibrous volume attached to the trim cover. One or more structural properties of a fibrous portion can be controlled to differ from that of other layers. The fibrous material may be a polyester nonwoven fabric vertically-lapped (v-lap) to provide spring-like cushioning effect. The fibers may be a blend of binder fibers and non-binder structural fibers. The binder fibers may be low-melt polymers such as COPA (Co-Polyamide) or COPES (Co-polyester). The binder fibers may also be a core-sheet fiber with a COPA or COPES sheet and a polyester core. The non-binder structural staple fibers may be polyester, hollow polyester fibers, polyester fibers of various cross-sections based on the spinneret geometry and three dimensionally crimped and/or conjugated polyester fibers.

In another embodiment, a method for manufacturing fibrous foam architecture is provided. The method includes laminating a heater film and a seat trim insert. The method includes forming a trim cover of the laminated seat trim insert. The method includes stacking a number of fibrous layers above the trim cover. The fibrous layers are stacked relatively parallel to one another. There may be other layers such as web adhesives placed in the fibrous layer stack or on top of the fibrous layer stack. The method further includes compression molding the stack of fibrous layers to form the fibrous foam architecture attached to the trim cover. A degree of the compression is controlled to impact one or more structural properties of each of the fibrous layers, such that one or more structural properties of a given fibrous layer is different from that of other layers. The method includes releasing the formed fibrous foam architecture.

In another embodiment, a fibrous foam architecture having fibrous layers such that porosity of a fibrous layer in a stack of such layers differs from that of other layers, impacting a feel of the layer.

The fibrous foam architecture is manufactured in such a manner that the porosity and/or density of one or more of the fibrous layers can be controlled to differ from that of other layers. The fibrous foam architecture can be easily attached to a trim cover of a cushion. Various methods of manufacture include attaching the fibrous layers to the trim cover by heat treatment followed by compression molding. Alternatively, the fibrous layers may undergo compression molding forming a fibrous monolith or bun. Following this, in another cycle, the fibrous bun and the trim cover may again undergo compression molding. In yet another embodiment, each of the fibrous layers may undergo pre-shaping through heat treatment, then the layers may undergo compression molding separately, and further a stack of the fibrous layers along with the trim cover may undergo compression molding. In another embodiment, a roll-to-roll process may be used to stack, compress, and fuse at least a portion of the fibrous layers together prior to shaping by a mold.

Figure 1:
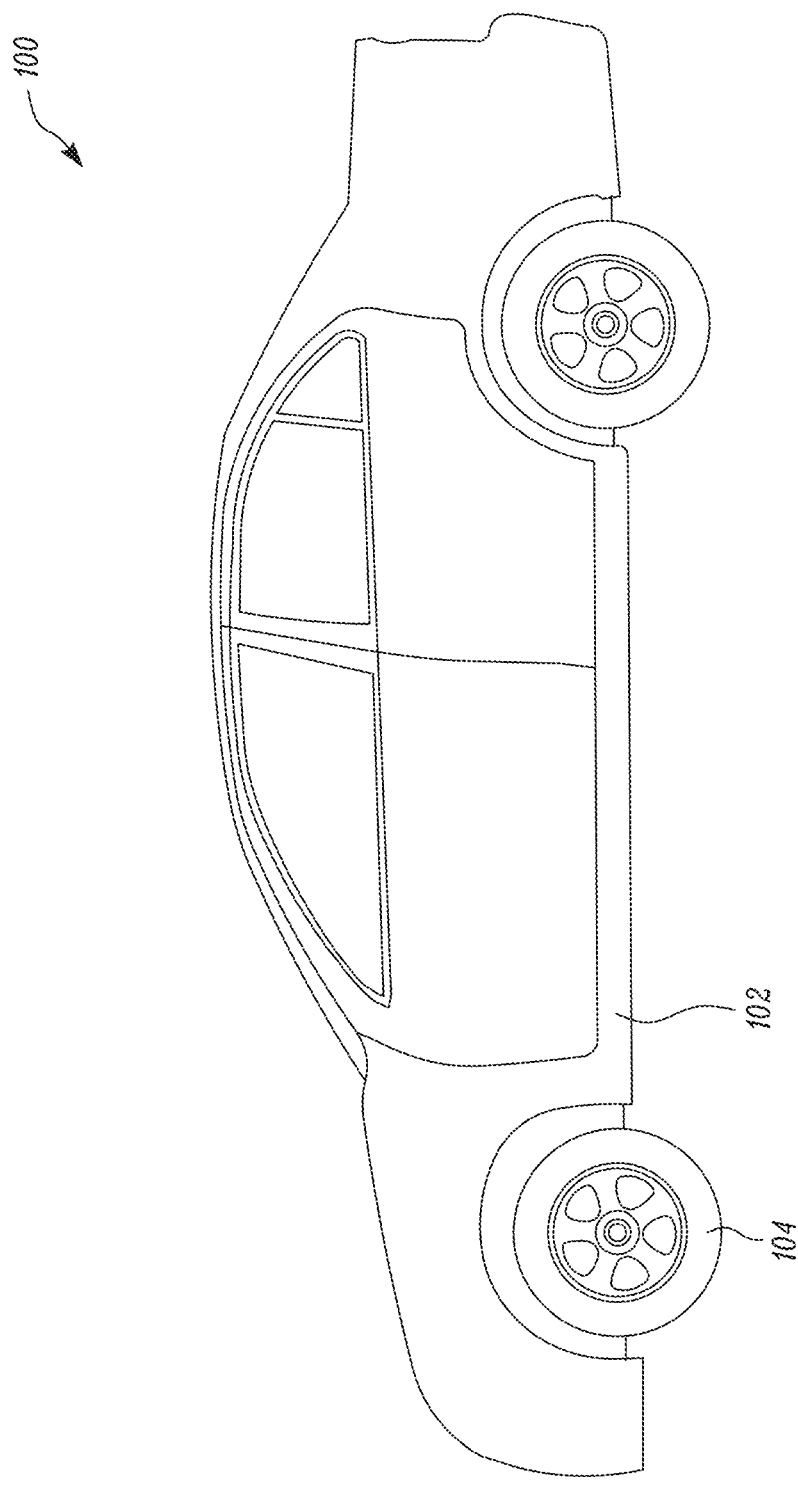
FIG. 1 illustrates a side profile of an exemplary vehicle according to certain embodiments of the invention.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting it.

DETAILED DESCRIPTION

FIG. 1 illustrates a side profile of an exemplary vehicle 100 such as, for example, a passenger car, truck, sport utility vehicle, or van. The vehicle 100 includes a frame 102 that is supported by a set of wheels 104. The vehicle 100 includes a power source (not shown) configured to propel the vehicle 100.

Passenger seating in the vehicle includes cushions of different shapes and sizes. The present disclosure relates to various embodiments of fibrous (vertically lapped polyester) foam architecture that may be utilized for back and seat cushions. The details of the fibrous foam architecture and the process for forming the cushions will be explained in connection with FIGS. 2 to 13.

Figure 2:
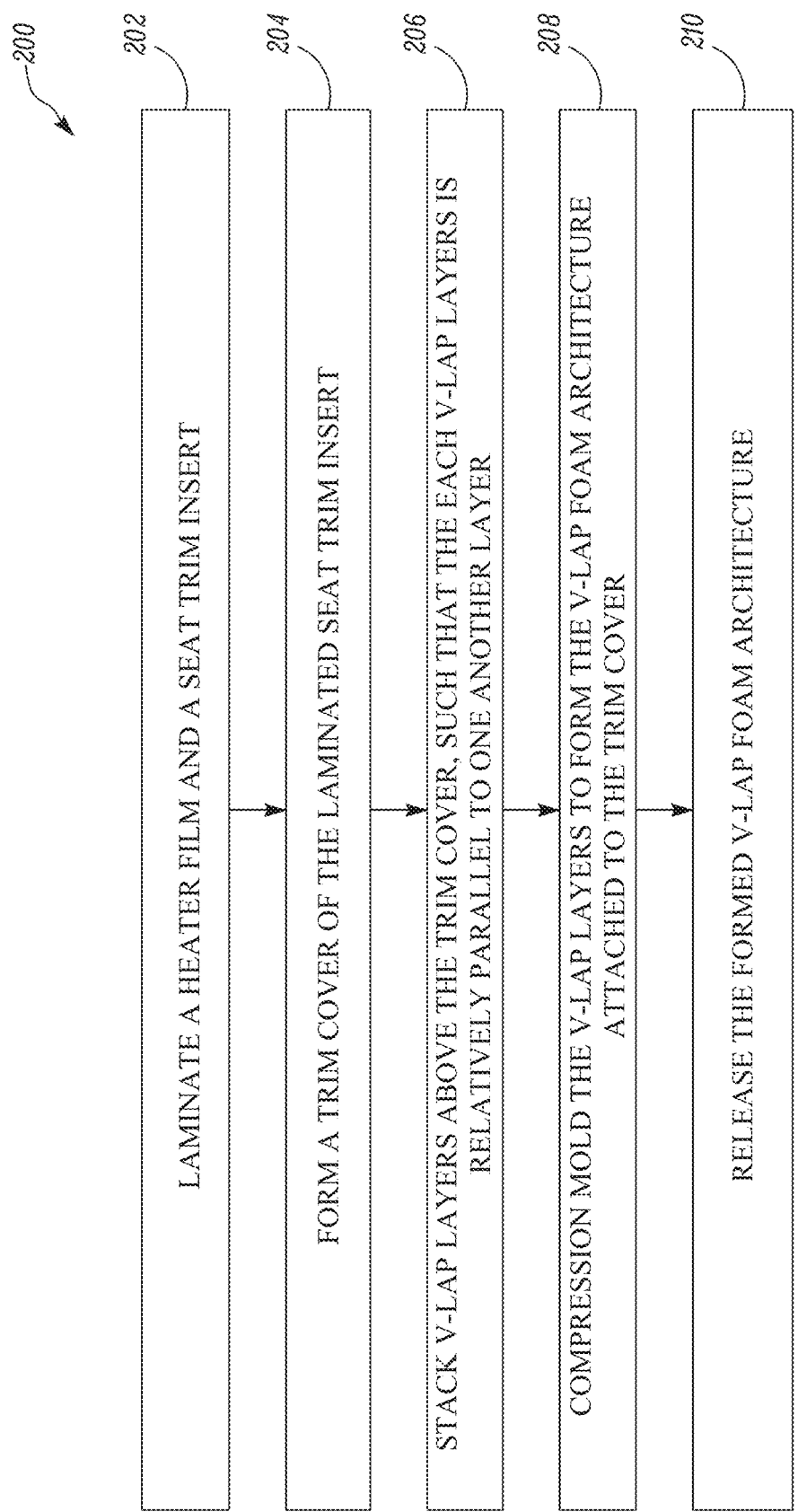
FIG. 2 illustrates a flowchart of a method for forming fibrous foam architecture according to certain embodiments of the invention.
Figure 3:
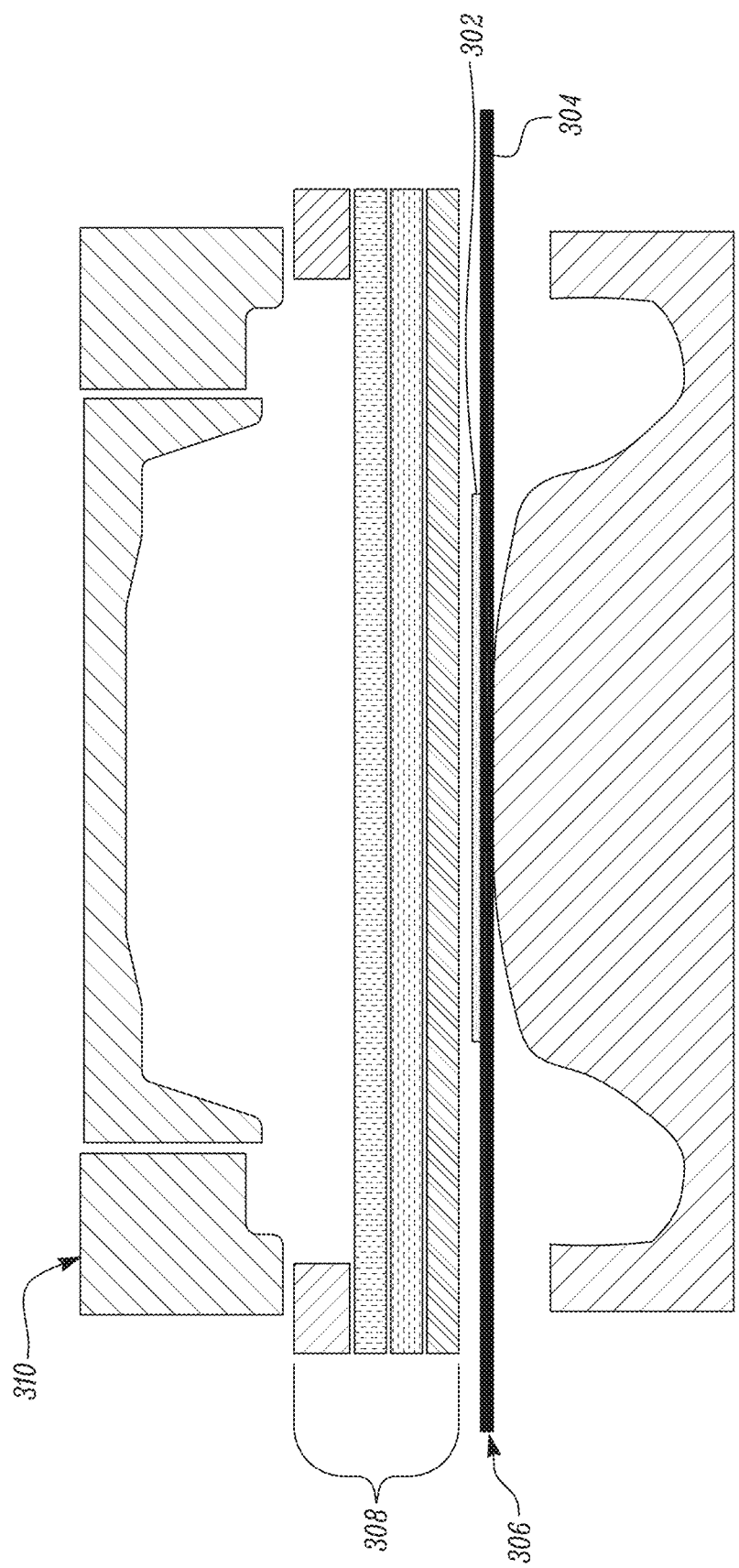
FIGS. 3 to 5 illustrate cross-sectional views of different procedural steps in forming the fibrous foam architecture as per the method of FIG. 2 according to certain embodiments of the invention.
Figure 4:
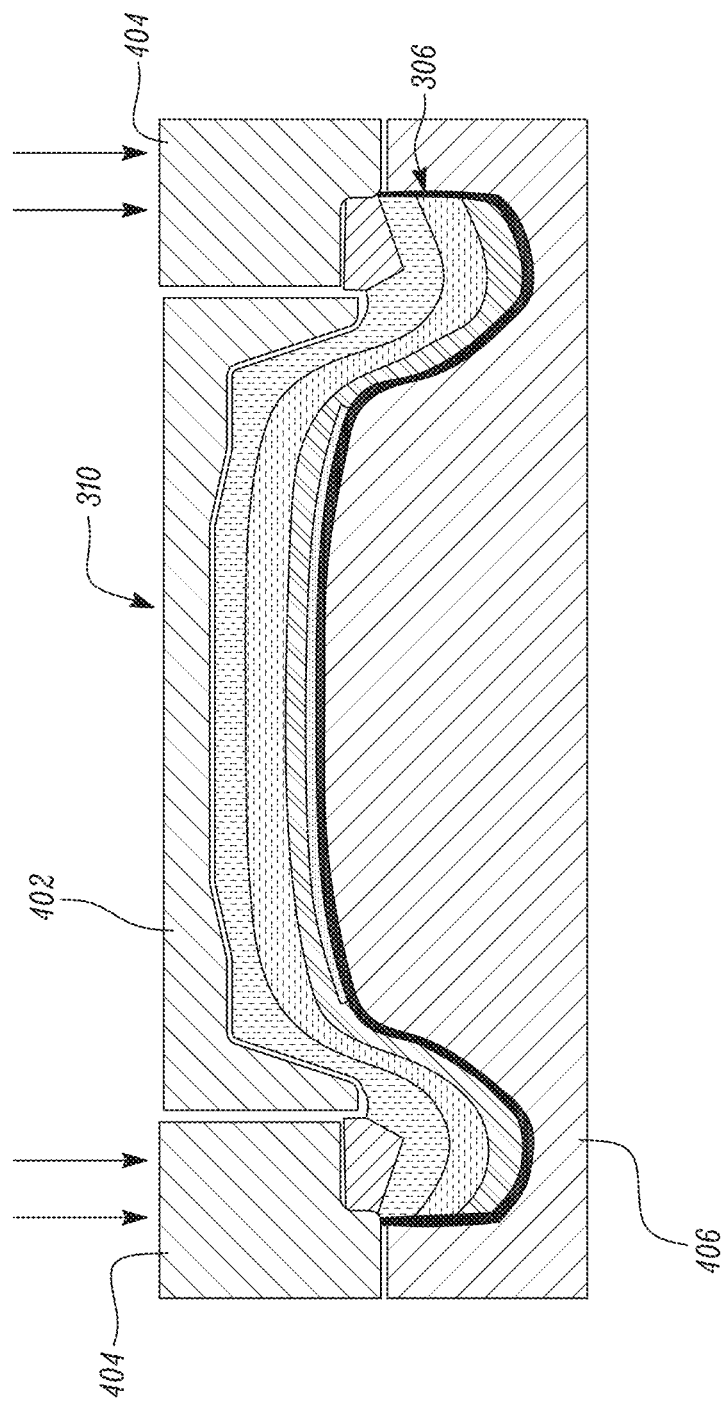
Figure 5:
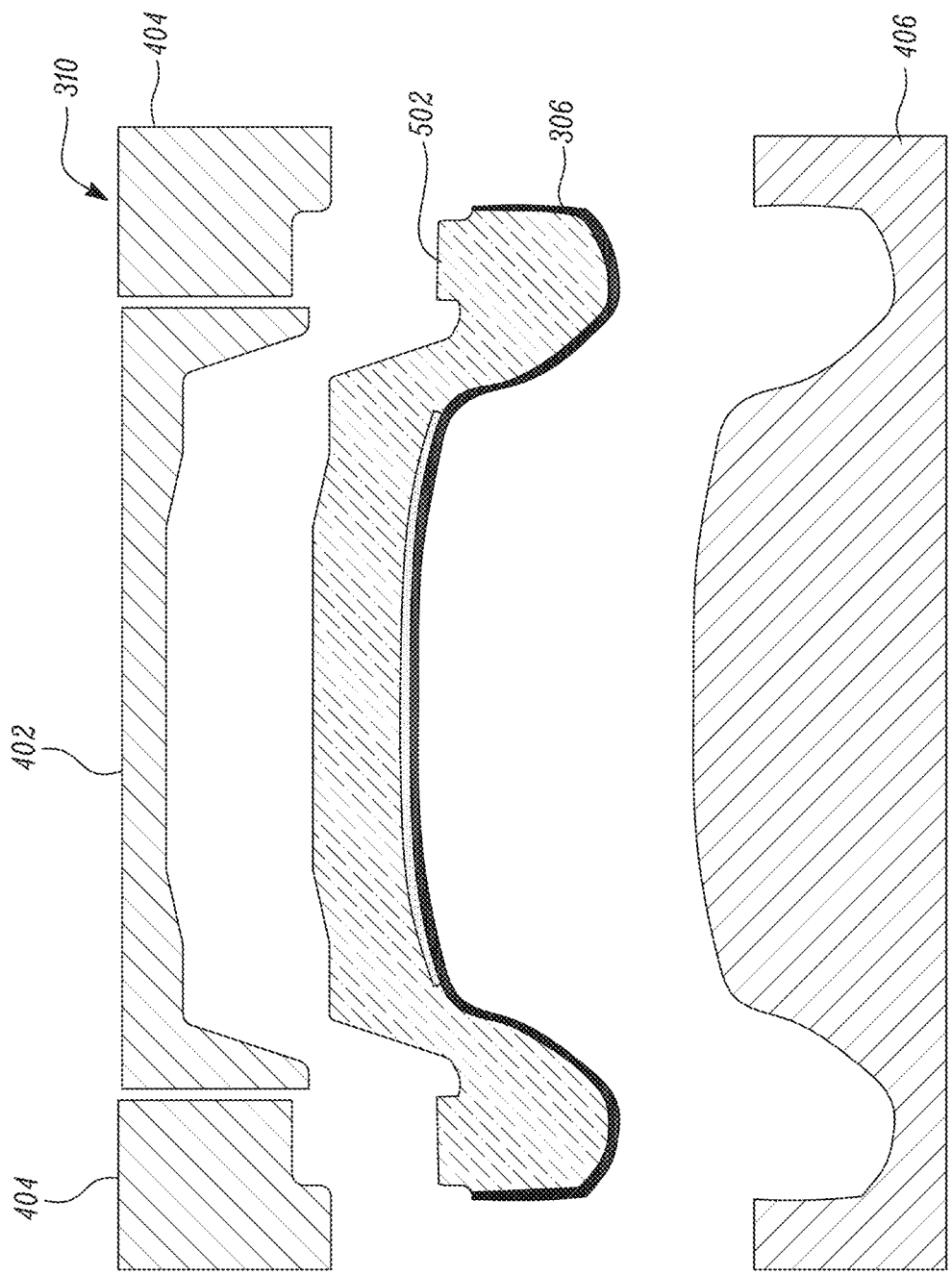

FIG. 2 is a flowchart of a method 200 for forming the fibrous foam architecture and FIGS. 3 to 5 illustrate different steps in the said process. Referring to FIGS. 2 and 3, at step 202, a heater film 302 and/or OCS film is laminated to a seat trim insert 304. In one example, the heater film 302 may be laminated behind a trim fabric for faster, more efficient heating and more sensitive capacitive sensing than existing systems behind a foam topper pad there to bridge polyurethane foam voids. In one situation, the process steps may include screen printing and optional lamination on the fabric, followed by die or laser cutting and lamination onto the fabric. At step 204, the seat trim cover 306 (see FIG. 3) is formed by the laminated heater film 302 and the seat trim insert 304. Thereafter, at step 206, a number of fibrous layers 308 are stacked above the trim cover 306, such that each of the fibrous layers 308 is relatively parallel to one another. In another embodiment, the trim cover 306 may be formed separately, that is the trim cover 306 is molded such that the central portion of the trim cover 306 having the heater film 302 attached thereto is raised relative to side portions of the trim cover 306.

Figure 14A:
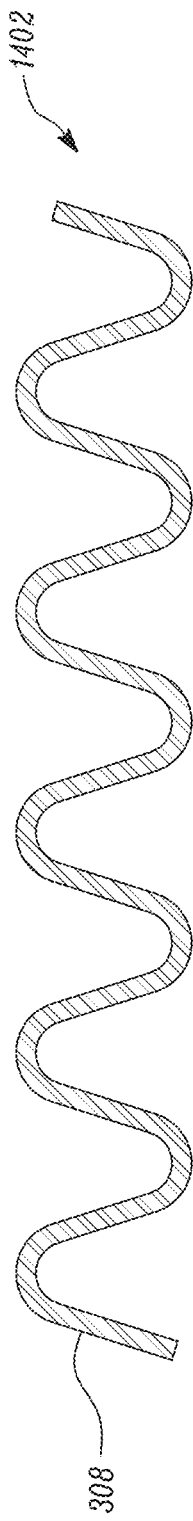
FIGS. 14A to 14C illustrate cross-sectional views of waves of varying pitch in connection with the fibrous foam architecture according to certain embodiments of the invention.
Figure 14B:
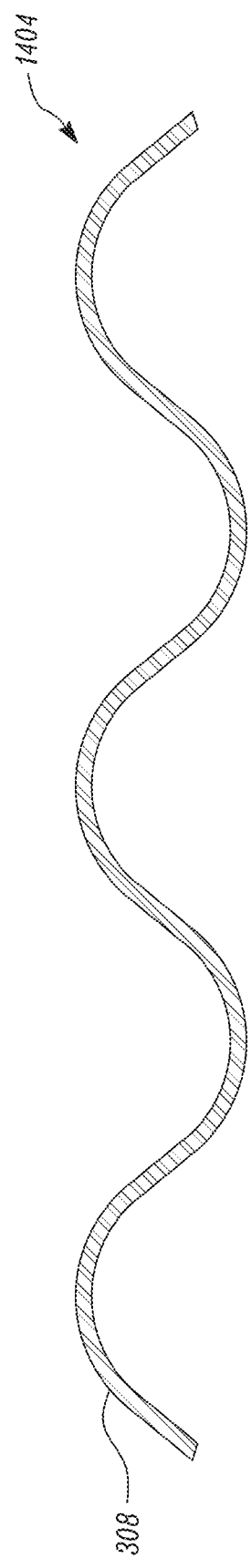
Figure 14C:
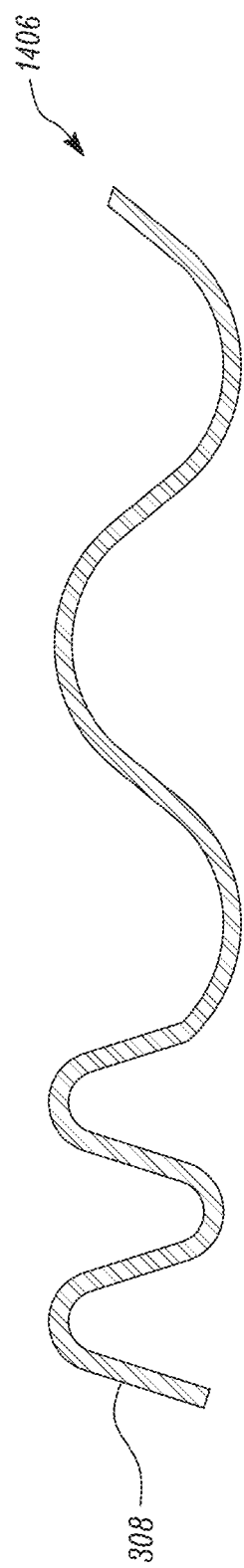

The fibrous layers 308 have different structural properties such that a porosity or density of the fibrous layer 308 can be controlled to differ from others in the stack of fibrous layers 308. In order to form each of the fibrous layers 308, initially fibrous fibers may be oriented relatively parallel to one another. Referring to FIG. 14, fibrous nonwoven sheets are formed into wave-like structures (see 1402, 1404, 1406 in FIG. 14) and then heated to cross link the fibrous fibers for the given layer. By controlling the pitch of the waves and thus the resulting porosity of the fibrous layer 308, the structural and plushness of the fibrous layer 308 may be controlled. For example, a higher pitch (see 1402) results in a less porous fibrous layer 308 that is denser (less porous) and has more structural integrity compared to one with a shorter pitch (see 1404). Conversely, a shorter pitch results in a fibrous layer 308 that is more porous and has more plushness compared to one with a higher pitch. In embodiments, a single fibrous layer 308 has regions of denser material and regions of less dense (and more porous) material, which may be formed by varying the pitch (see 1406) of the fibrous layer 308 throughout the given layer.

Figure 6A:
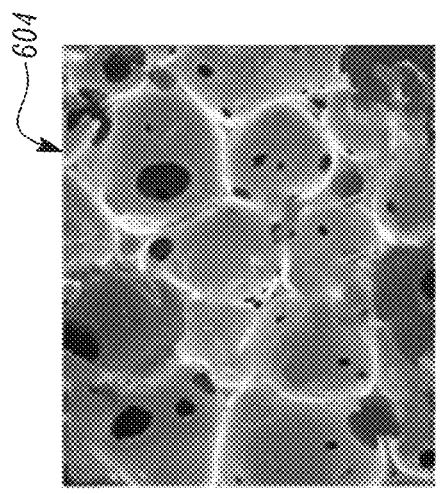
FIGS. 6A to 6D illustrate schematic microstructures of different fibrous layers of the fibrous foam architecture according to certain embodiments of the invention.
Figure 6B:
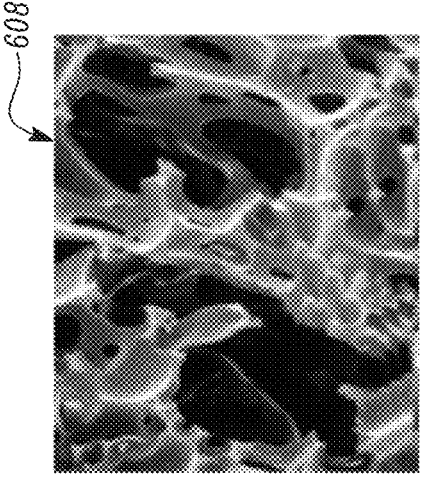
Figure 6C:
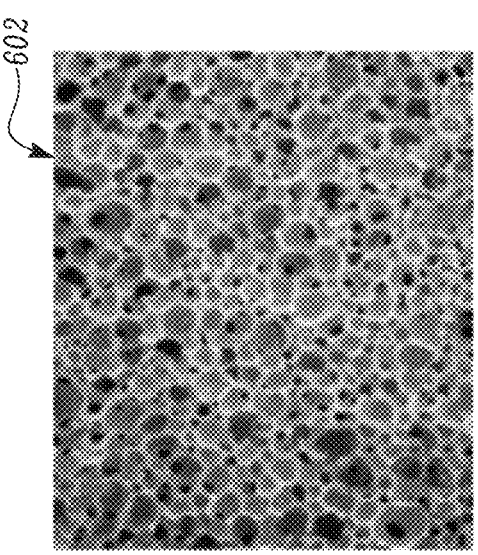
Figure 6D:
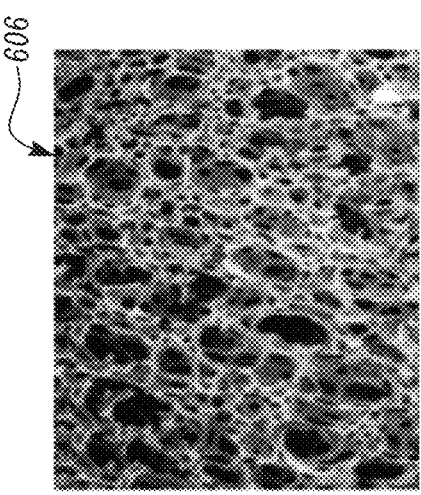

Referring to FIGS. 6A and 6B exemplary microstructures 602, 604 of relatively firmer polyurethane layers 308 are illustrated. Compression molding of the fibrous layers 308 can be controlled to form high density polyester with similar properties. Referring to FIGS. 6C and 6D exemplary microstructures 606, 608 of relatively softer polyurethane layers 308 are illustrated. In this case, the compression molding of the fibrous layers 308 is controlled to form low density polyester, resulting in the formation of plush or softer layers and air-permeable layers. The porosity and/or density of the fibrous layer 308 may impact a feel of the given fibrous layer 308. For example, open-cell-like structures (see 606, 608) in the fibrous layer 308 may provide a softer feel, while closed-cell-like structures (see 602, 604) in the fibrous layer 308 may provide structural stability and capacity to bear external loads that are applied on the fibrous foam architecture.

Referring FIGS. 2 and 3, the fibrous layers 308 may be stacked in such a manner that the relatively softer fibrous layer 308 is proximate to the heater film 302, and the relatively denser fibrous layer 308 is further away from the heater film 302. The number of fibrous layers 308 that are stacked above the trim cover 306 may vary based on the application. In one example, five fibrous layers 308 may be stacked one on top another. In another example, seven fibrous layers 308 may be stacked one above another. In yet another example, the fibrous layer 308 may not be a continuous layer, such that more fibrous layers 308 are provided at respective corner portions of the trim cover 306 and lesser fibrous layers 308 are provided at a central portion of the trim cover 306.

Further, referring to FIGS. 2, 3 and 4, at step 208, after stacking the fibrous layers 308 above the trim cover 306, the fibrous layers 308 and the trim cover 306 are loaded into a compression tool 310. Thereafter, as shown in FIG. 4, the fibrous layers 308 are heated and undergo compression molding along with the trim cover 306. Top 402 and side portions 404 of the tool 310 are brought downwards and towards a bottom portion 406 of the tool 310. At step 210, the formed fibrous foam architecture 502 is released from the tool 310 (see FIG. 5).

The porosity and/or density of one or more the fibrous layers 308 in the fibrous foam architecture 502 may be different from that of other fibrous layers 308. For example, in one case, an outermost fibrous layer 308 of the fibrous foam architecture 502 that may contact an external load is more porous or less dense than other fibrous layers, lending a soft hand feel. In another example, the porosity of the fibrous foam architecture 502 may increase with distance of the given fibrous layer 308 from that fibrous layer 308 that may come in contact with the external load.

Figure 7:
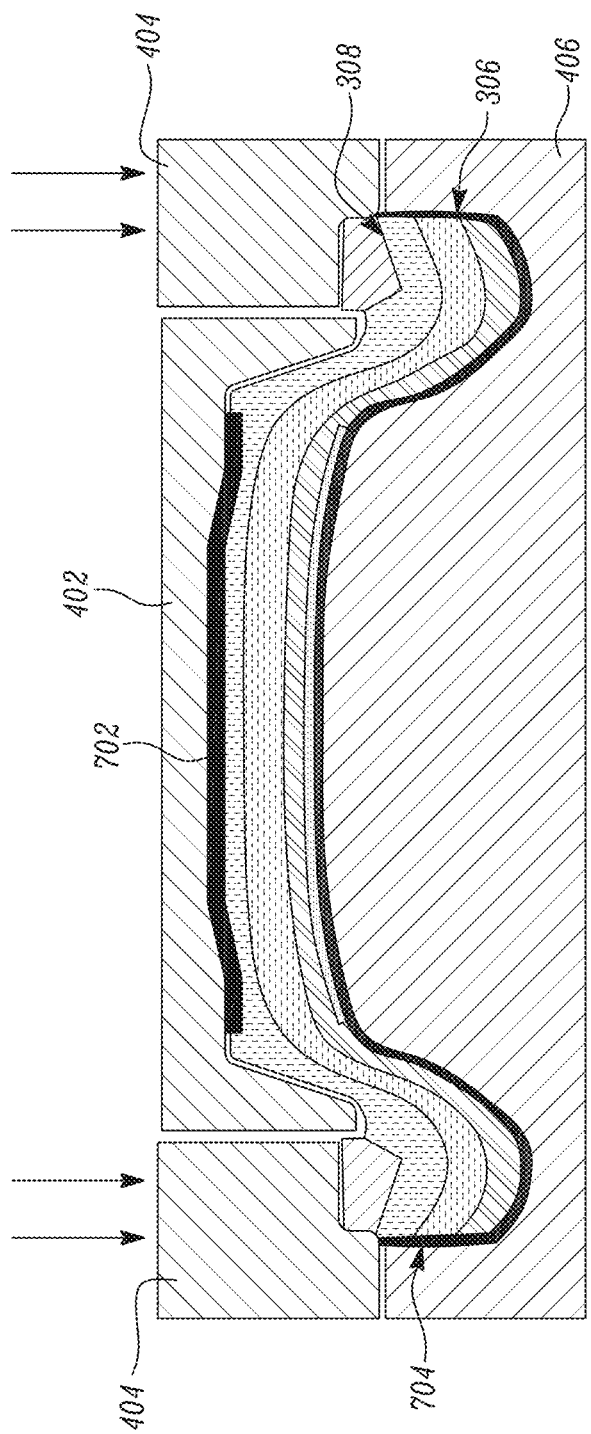
FIG. 7 illustrates a cross-sectional view of another embodiment of the fibrous foam architecture having a lumbar support according to certain embodiments of the invention.

Referring to FIG. 7, additionally or optionally, in some embodiments, a backing plate such as a backrest lumbar support 702 may be provided in contact with the fibrous layers 308. In this case, the laminate may be formed by placing the heater film 302 above the trim insert 304, laminating and then molding to form the trim cover 306. The lumbar support 702 is positioned on the top portion 402 of the tool 310. The stack of fibrous layers 308 is placed below the lumbar support 702 in the top portion 402 of the tool 310. As described above, the fibrous layers 308 have varying porosity and/or density that are different from layer to layer. The trim cover 306 is loaded in the bottom portion 406 of the tool 310 and the top portion 402 is brought downwards and towards the bottom portion 406 for compression molding. The fibrous foam architecture 704 is formed and released from the tool 310. Such cushions may be used as back cushions for various applications.

Figure 8:
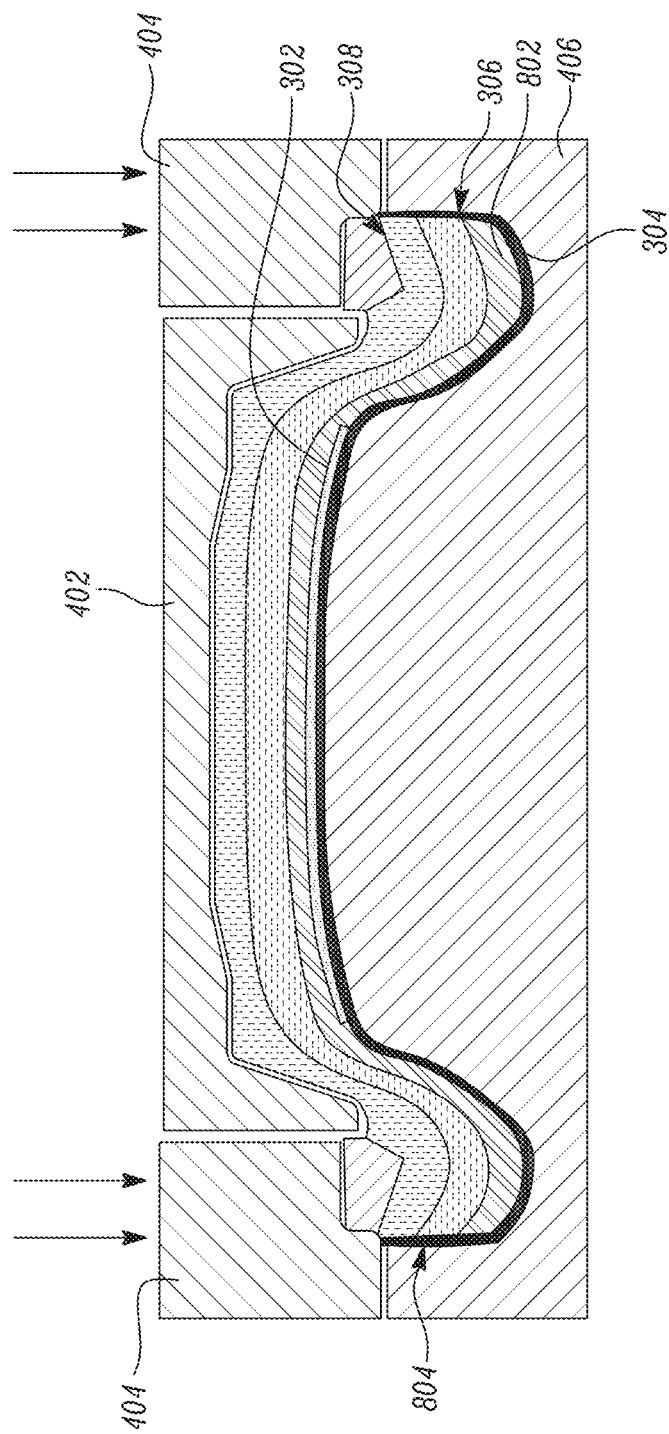
FIG. 8 illustrates a cross-sectional view of another embodiment of the fibrous foam architecture having a soft backing according to certain embodiments of the invention.

Referring to FIG. 8, additionally or optionally, in some embodiments, a shearing pad 802 is provided in contact with the fibrous layers 308. In this case, the laminate is formed by placing the shearing pad 802 above the heater film 302, and then placing the heater film 302 above the trim insert 304. The shearing pad 802, the heater film 302 and the trim insert 304 are laminated and molded to form the trim cover 306. The stack of fibrous layers 308 is positioned in the top portion 402 of the tool 310. As described above, the fibrous layers 308 have varying porosity and/or density that are different from layer to layer. For example, the shearing pad 802 may be in contact with a relatively soft fibrous layer 308, and the fibrous layer 308 positioned further away from the shearing pad 802 may be relatively dense. The trim cover 306 is loaded in the bottom portion 406 of the tool 310 and the top and side portions 402, 404 of the tool 310 are brought downwards and towards the bottom portion 406 for compression molding. The fibrous foam architecture 804 is formed and released from the tool 310. Such cushions may be used as back cushions for various applications.

Figure 9:
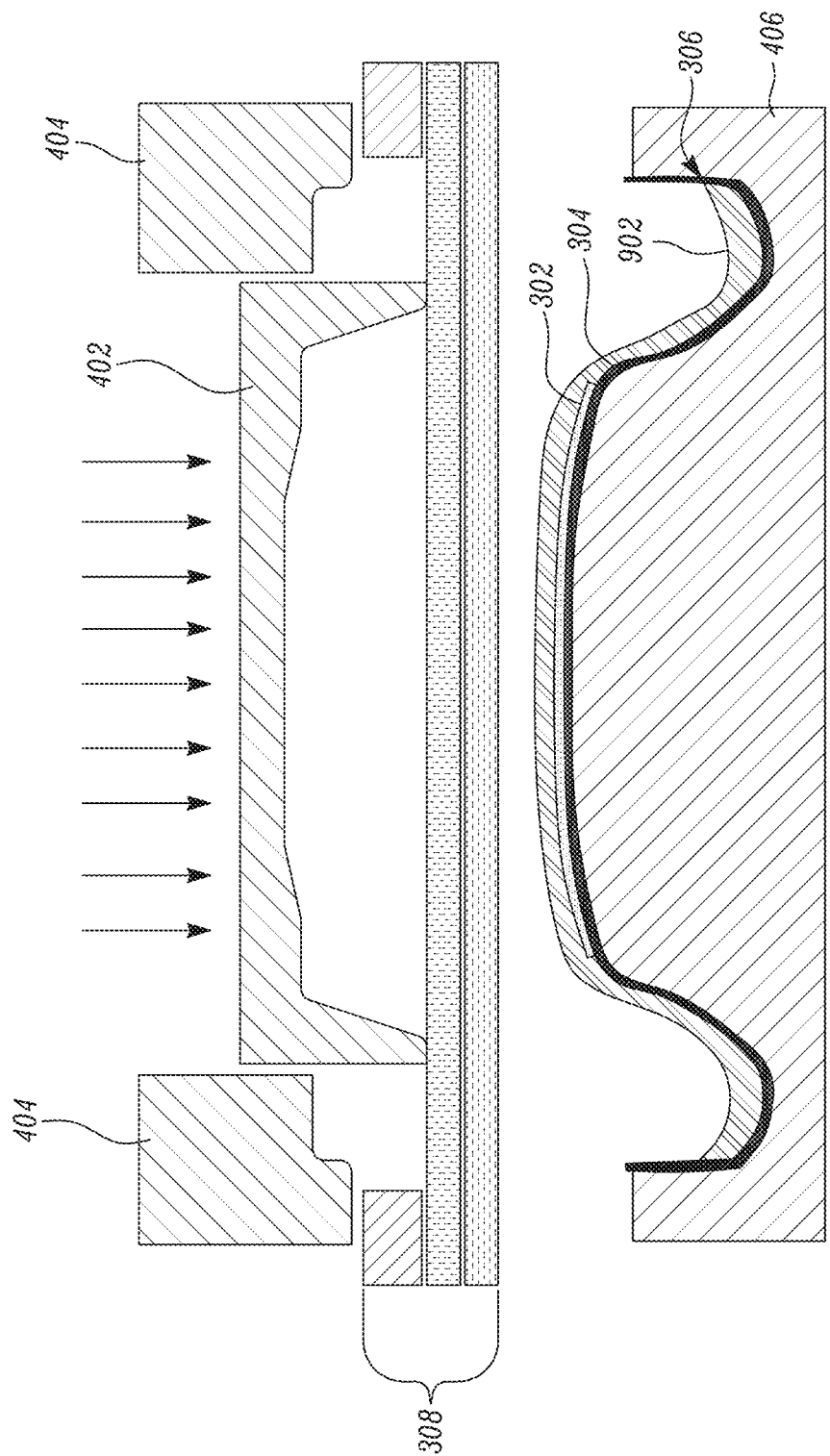
FIG. 9 illustrates a cross-sectional view of alternate method of manufacturing the fibrous foam architecture according to certain embodiments of the invention.

Referring to FIG. 9, additionally or optionally, in some embodiments, a soft backing layer 902 is provided in contact with the fibrous layers 308. In this case, the soft backing layer 902 is placed above the heater film 302, and the heater film 302 in turn is placed above the trim insert 304. The soft backing layer, the heater film 302 and the trim insert 304 are laminated to form the trim cover 306. The stack of fibrous layers 308 is positioned proximate to the top portion 402 of the tool 310. As described above, the fibrous layers 308 have varying porosity and/or density that are different from layer to layer. For example, the soft backing layer 902 may be in contact with a relatively medium density fibrous layer 308, and the fibrous layer 308 positioned further away from the soft backing layer 902 may be firm. The trim cover 306 is loaded in the bottom portion 406 of the tool 310 and then the top and side portions 402, 404 of the tool 310 are brought downwards and towards the bottom portion 406 for compression molding. The fibrous foam architecture is formed and released from the tool 310.

Figure 10:
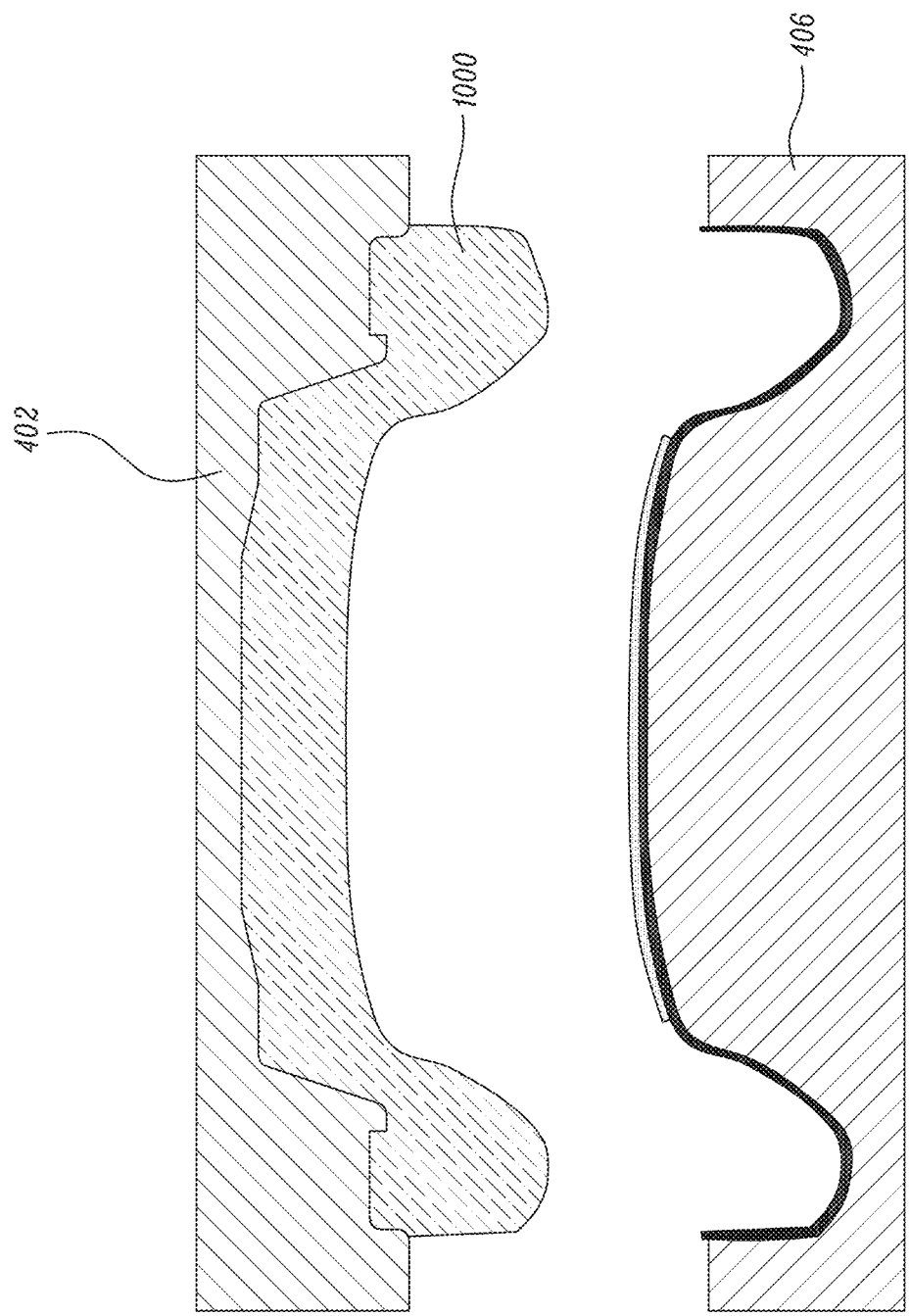
FIG. 10 illustrates a cross-sectional view of another embodiment of the fibrous foam architecture that is formed separately and then fused with the trim cover according to certain embodiments of the invention.

Referring to FIG. 10, in another embodiment, initially the stack of fibrous layers 308 undergoes compression molding separately. The heated stack of the fibrous layers 308 is positioned in the tool 310 for compression molding to from a fibrous bun 1000. As described above, the fibrous layers 308 have varying porosity and/or density that are different from layer to layer. Further, the fibrous bun 1000 is placed in the top portion 402 of the tool 310. The fibrous bun 1000 is surface heated. The trim cover 306 is loaded in the bottom portion of the tool 310 and then the top portion 402 of the tool 310 is brought downwards and towards the bottom portion 406 for compression molding. The fibrous foam architecture is formed and released from the tool 310.

Figure 11:
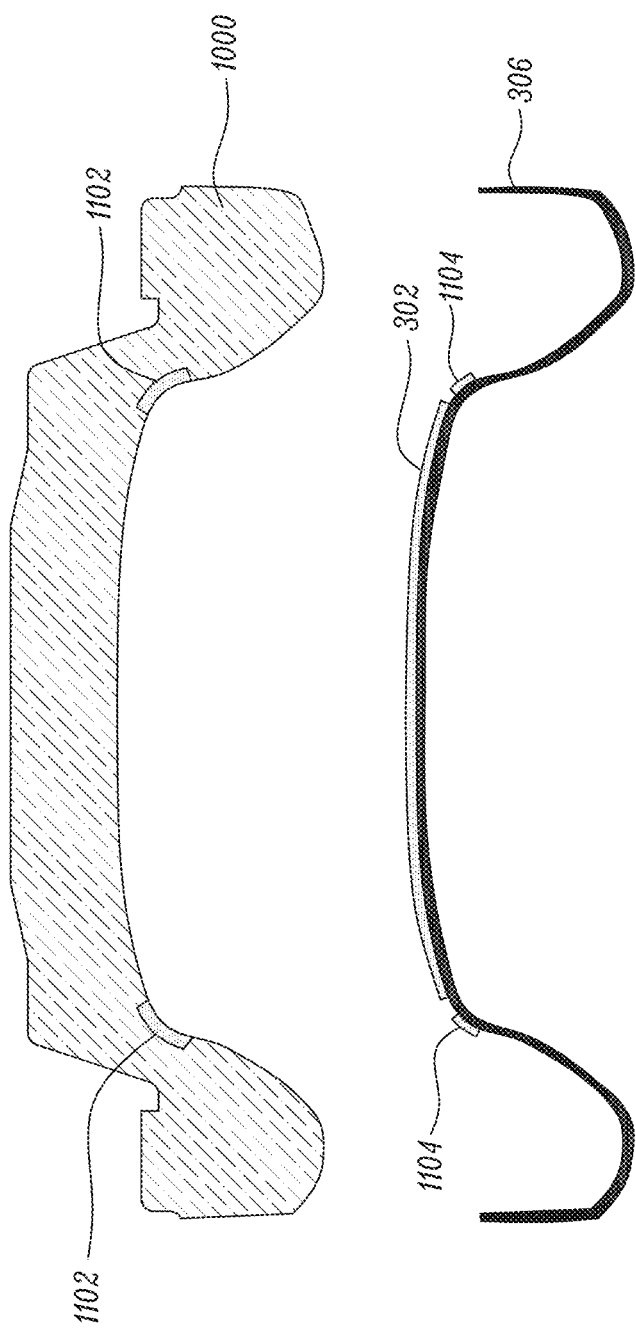
FIGS. 11 and 12 illustrate cross-sectional view of other embodiments of attaching the fibrous foam architecture to a trim cover of a cushion using attachment elements according to certain embodiments of the invention.
Figure 12:
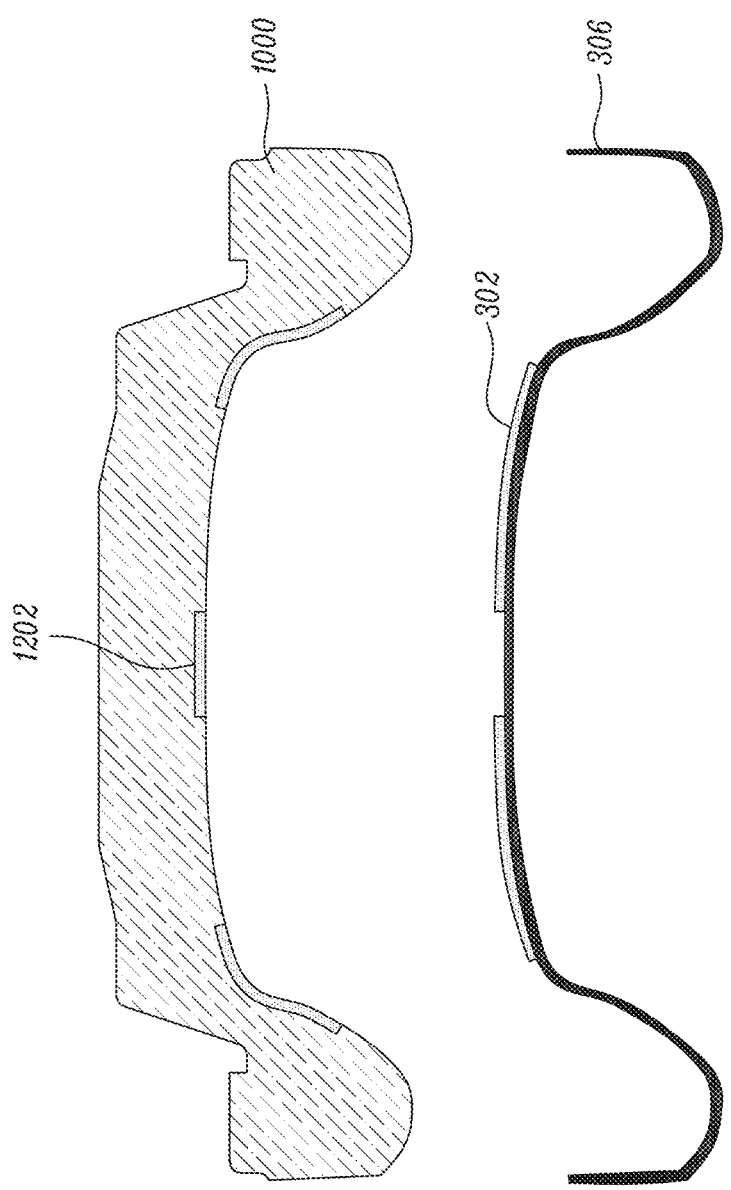

FIGS. 11 and 12 illustrate alternate methods of attaching the fibrous bun 1000 to the trim cover 306 including the heater film 302. For example, referring to FIG. 11, the heated fibrous layers 308 are initially positioned in a stack-like arrangement. Attachment elements such as hooks 1102 may be provided on the soft fibrous layer. The fibrous layers 308 then undergoes compression molding to form the fibrous bun 1000. As described above, the fibrous layers 308 have varying porosity and/or density that are different from layer to layer. The fibrous bun 1000 is positioned above and brought downwards and towards the trim cover 306. Loops 1104 are provided at corresponding locations on the trim cover 306. The hooks 1102 and the loops 1104 engage, causing the fibrous bun 1000 to attach with the trim cover 306 to form the fibrous foam architecture.

Alternatively, as shown in FIG. 12, the heated fibrous layers 308 is initially positioned in a stack-like arrangement. Hook patches 1202 are provided on the soft fibrous layer. The fibrous layers 308 may then undergo compression molding to form the fibrous bun 1000. As described above, the fibrous layers 308 have varying porosity and/or density that are different from layer to layer. Further, the fibrous bun 1000 is placed in the top portion 402 of the tool 310. The trim cover 306 has the heater film 302 and a loopy backing or a mesh structure. The fibrous bun 1000 is positioned above and brought downwards and towards the trim cover 306. The hook patches 1202 attach with mesh-like structure of the trim cover 306 to form the fibrous foam architecture.

Figure 13:
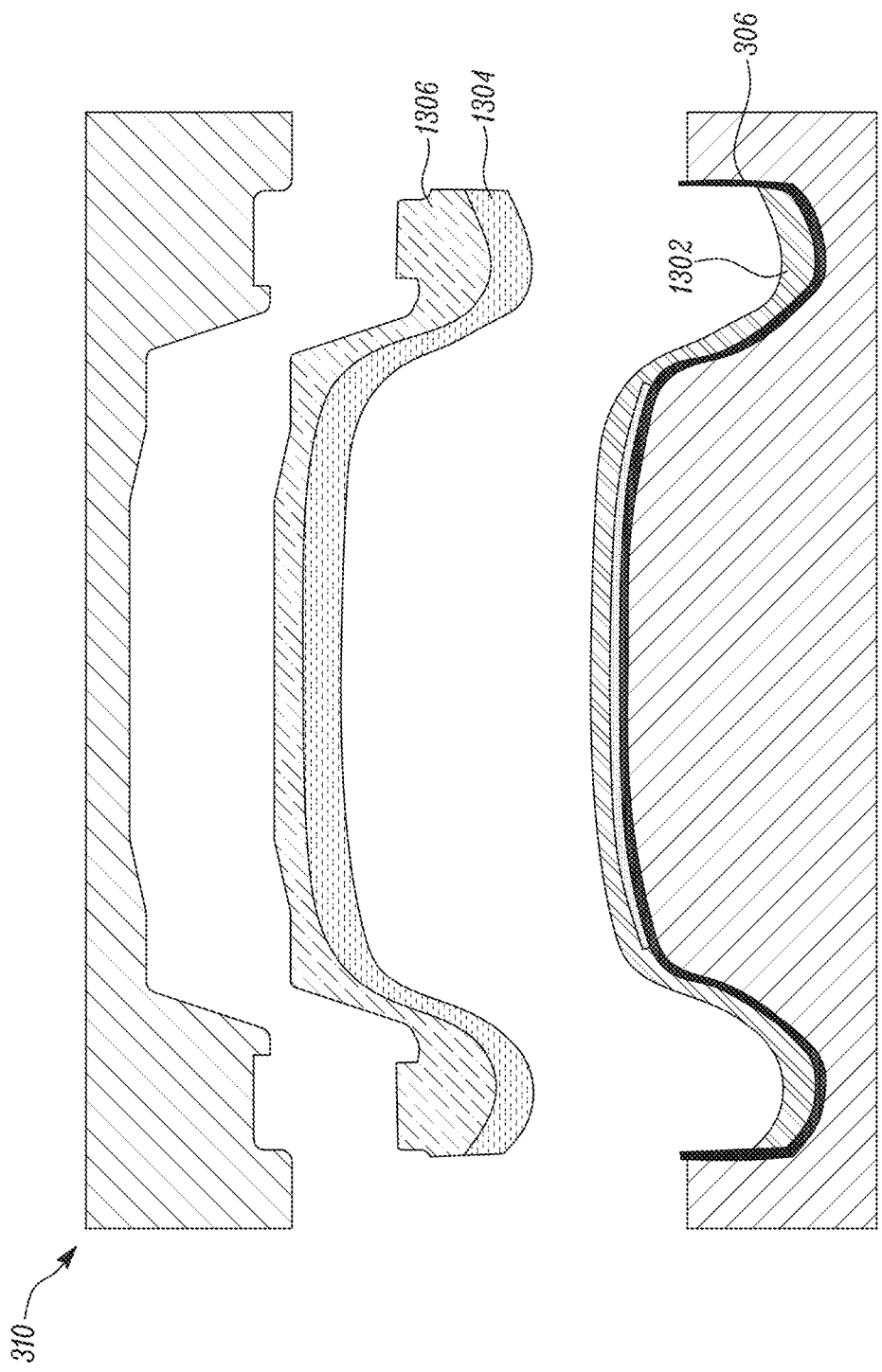
FIG. 13 illustrates a cross-sectional view of another embodiment of manufacturing the fibrous foam architecture using pre-shaping techniques according to certain embodiments of the invention.

Referring to FIG. 13, yet another method of forming the fibrous foam architecture is provided. In this case, each of the fibrous layers 308 undergo compression molding separately such that each of the fibrous layers 308 is pre-shaped by heat press. For example, initially the firm fibrous layer 1306 undergoes compression molding during the pre-shaping process (not shown). Thereafter, the medium fibrous layer 1304 is loaded in the tool 310 and undergoes compression molding during the pre-shaping process (not shown). Further, the soft fibrous layer 1302 is positioned above the trim cover 306 having the heater film 302. The soft fibrous layer 1302 and the trim cover 306 undergo compression molding during the pre-shaping process (not shown). The soft, medium and firm fibrous layers 1302, 1304, 1306 have different densities and porosities that are controlled during the pre-shaping of the respective layers. Thereafter, as shown in FIG. 13, after the pre-shaping of each of the fibrous layers, the soft fibrous layer 1302 and the trim cover 306 are again loaded into the tool 310, the medium and firm fibrous layers 1304, 1306 are placed above the soft fibrous layer 1302 and all layers with the trim cover 306 undergo compression molding. A softness gradient can also be achieved by allowing portions of the fibrous stack such as the surface cool below the fiber flow temperature before compression-molding, such that the cooled portions prior to molding are elastically compressed whereas the warmer portions are plastically compressed. Upon release from mold, the previously warmer, plastically deformed portions have higher density (and therefore more rigid) and the previously cooler portions have lower density (softer) after springing back towards original thickness.

The fibrous foam architecture may have a very low odor, is recyclable and can incorporate recyclable polyester. The fibrous foam architecture is formable by compression molding and is weldable to other polyester layers. The fibrous layers can be heated by convective hot air, forced hot air, infrared, microwave, ultrasound, contact heating and other heating methods. Compression molding is a relatively easy, less laborious and less time-consuming process. The fibrous foam architecture is light-weight, breathable, and non-yellowing.

Figure 15:
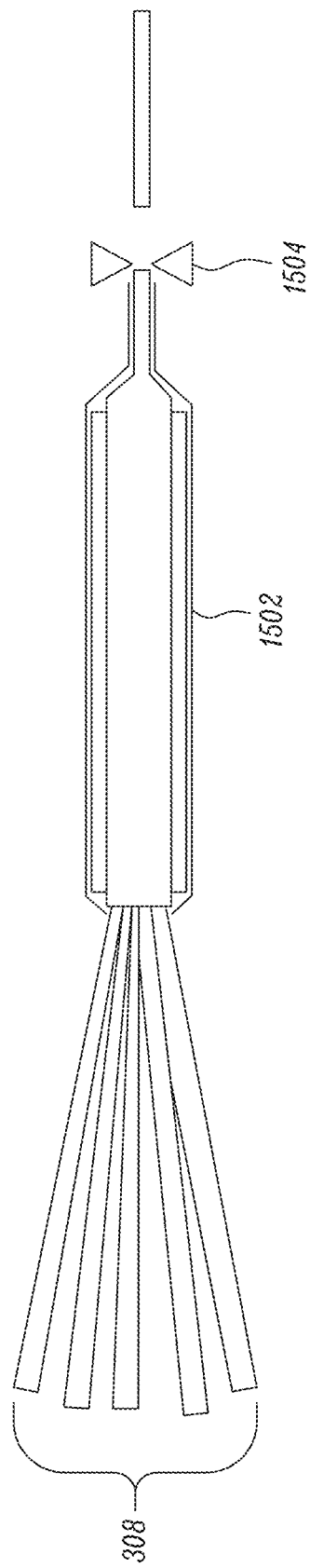
FIG. 15 illustrates a roll-to-roll process for the fibrous foam architecture according to certain embodiments of the invention.

FIG. 15 illustrates a roll-to-roll lamination process for manufacturing the fibrous foam architecture. Initially, the fibrous layers 308 are stacked. Further, the fibrous layers 308 undergo pre-compression and are continuously pulled into a heating chamber 1502 having hot air/gas or a heating element. This causes at least a portion of the fibrous layers 308 to fuse together. The roll-to-roll lamination process may take place prior to shaping by the mold. There may be additional functional layers laminated to the fibrous layers 308 such as, but not limited, to an adhesive web or film. The formed laminate is then die cut using a cutting knife 1504 and follows the processes described above in connection with FIGS. 3 to 5.

Figure 16:
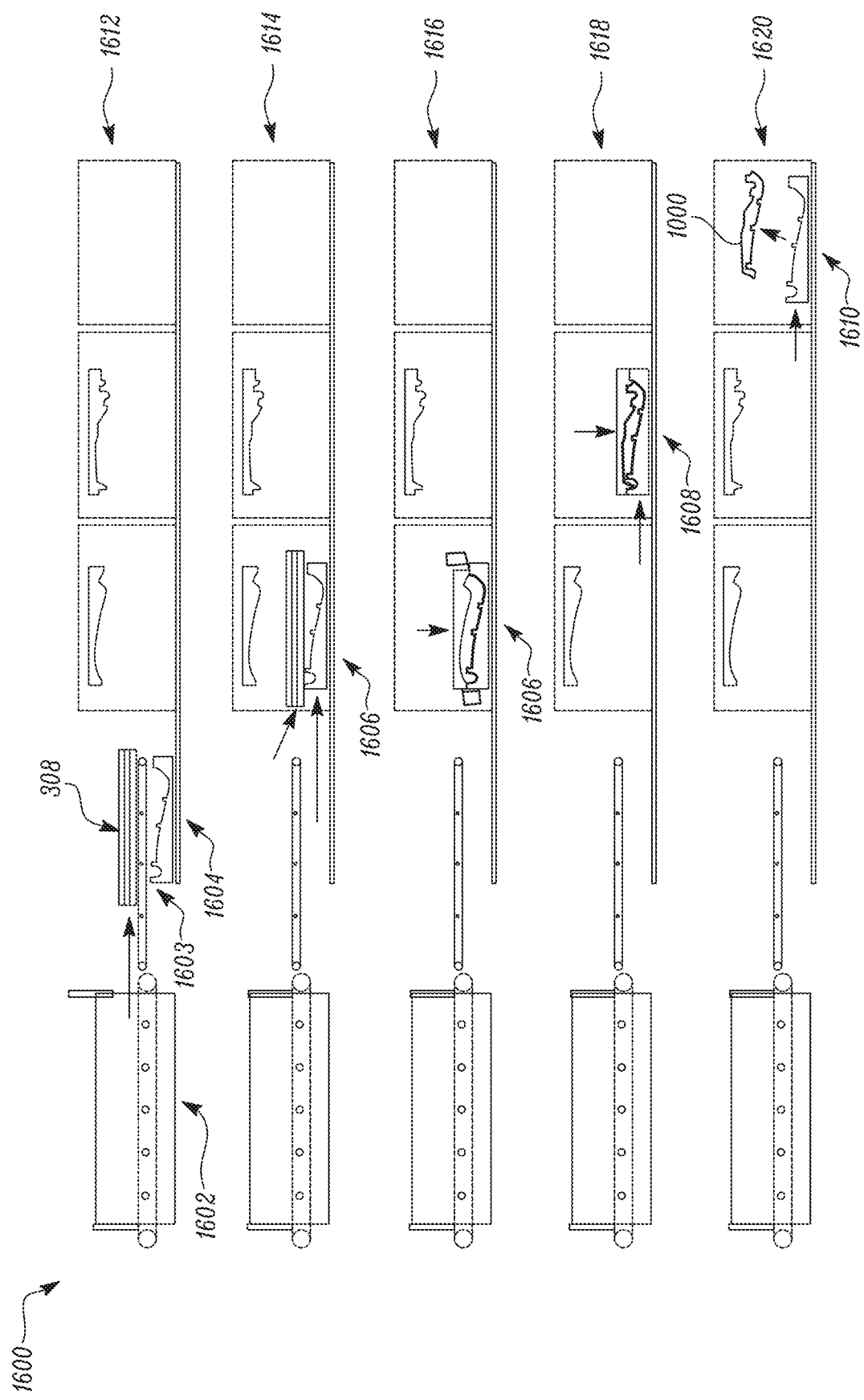
FIG. 16 illustrates cross-sectional views of different procedural steps in forming the fibrous foam architecture using compression molding and hot stamping.

FIG. 16 illustrates a manufacturing line 1600 forming the fibrous bun 1000 using compression molding and hot stamping. Initially, fibrous layers 308 exit heating station 1602 to transfer station 1604 for placement onto a bottom tool 1603, which immediately moves to cold press station 1606 to establish the target density profile and cut off excess material at edges. Bottom tool 1603 then moves to hot stamp station 1608 to sculpt one side of the fibrous volume without further changing the internal bulk density. Finally, bottom tool 1603 moves to extraction station 1610 for removal of finished fibrous bun 1000.

Figure 17:
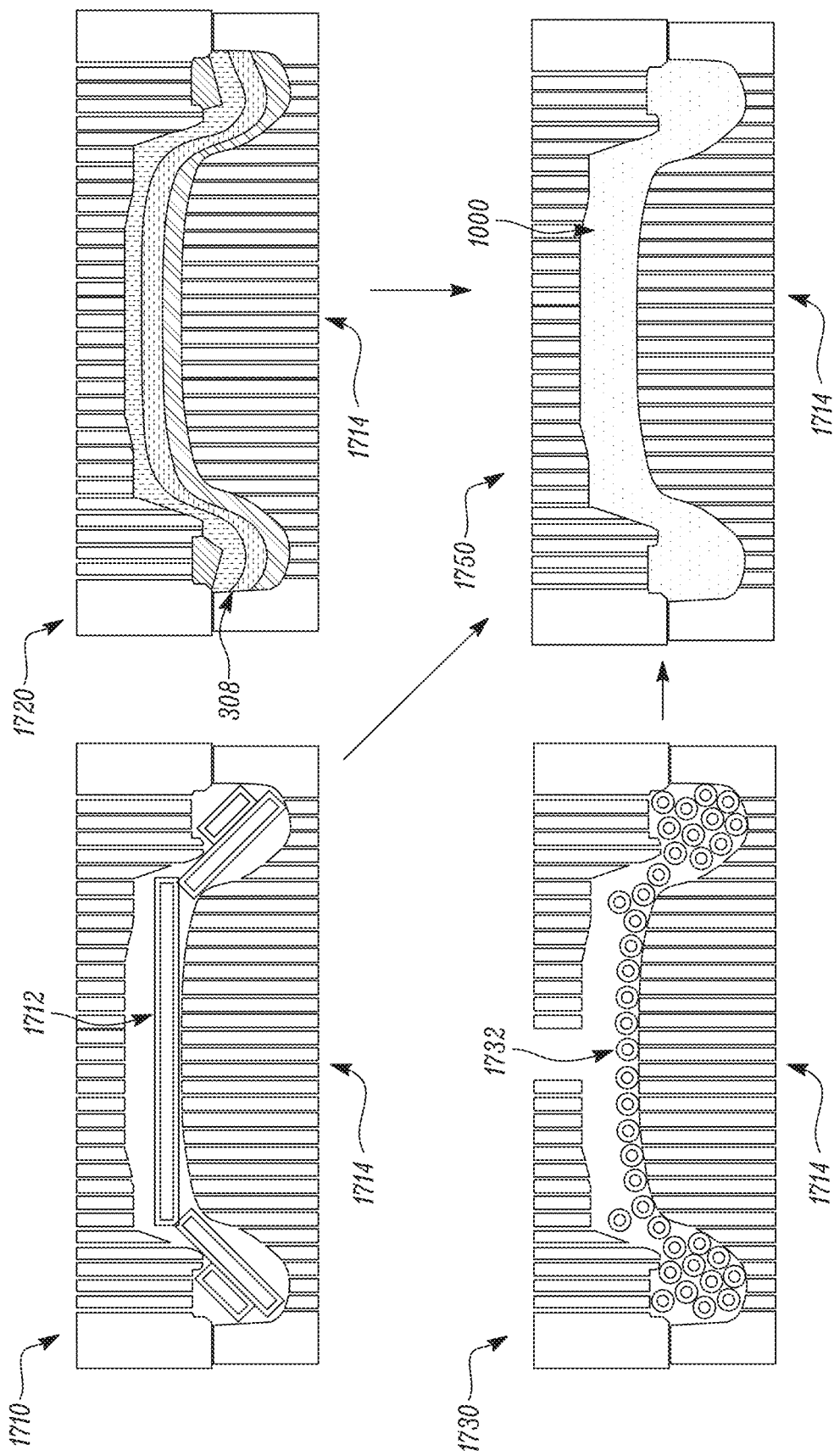
FIG. 17 illustrates cross-sectional views of another embodiment of manufacturing the fibrous foam architecture using pre-compressed fibrous layers expanding in a tool upon heating, non-compressed fibrous layers compressed by a tool before heating, and pre-compressed fibrous pellets partially filling a tool before heating.

Examples of alternatives to pre-heated stack compression molding are shown in FIG. 17, all involving heating fibrous material in a mold to define the shape of the resulting fibrous bun 1000. In process example 1710, slabs of pre-compressed fibrous sheets are placed into a porous mold 1714, then heated to allow the fibrous sheets to expand, fill the mold, and bond to adjacent sheets. In process example 1720, fibrous layers 308 are placed onto mold 1714 and compressed by the mold before heating to form fibrous bun 1000. In process example 1730, pellets 1732 of pre-compressed fibers are inserted into a mold 1714 then heated to allow the pellets to expand, fill the mold, and bond to adjacent pellets to form fibrous bun 1000.

Figure 18:
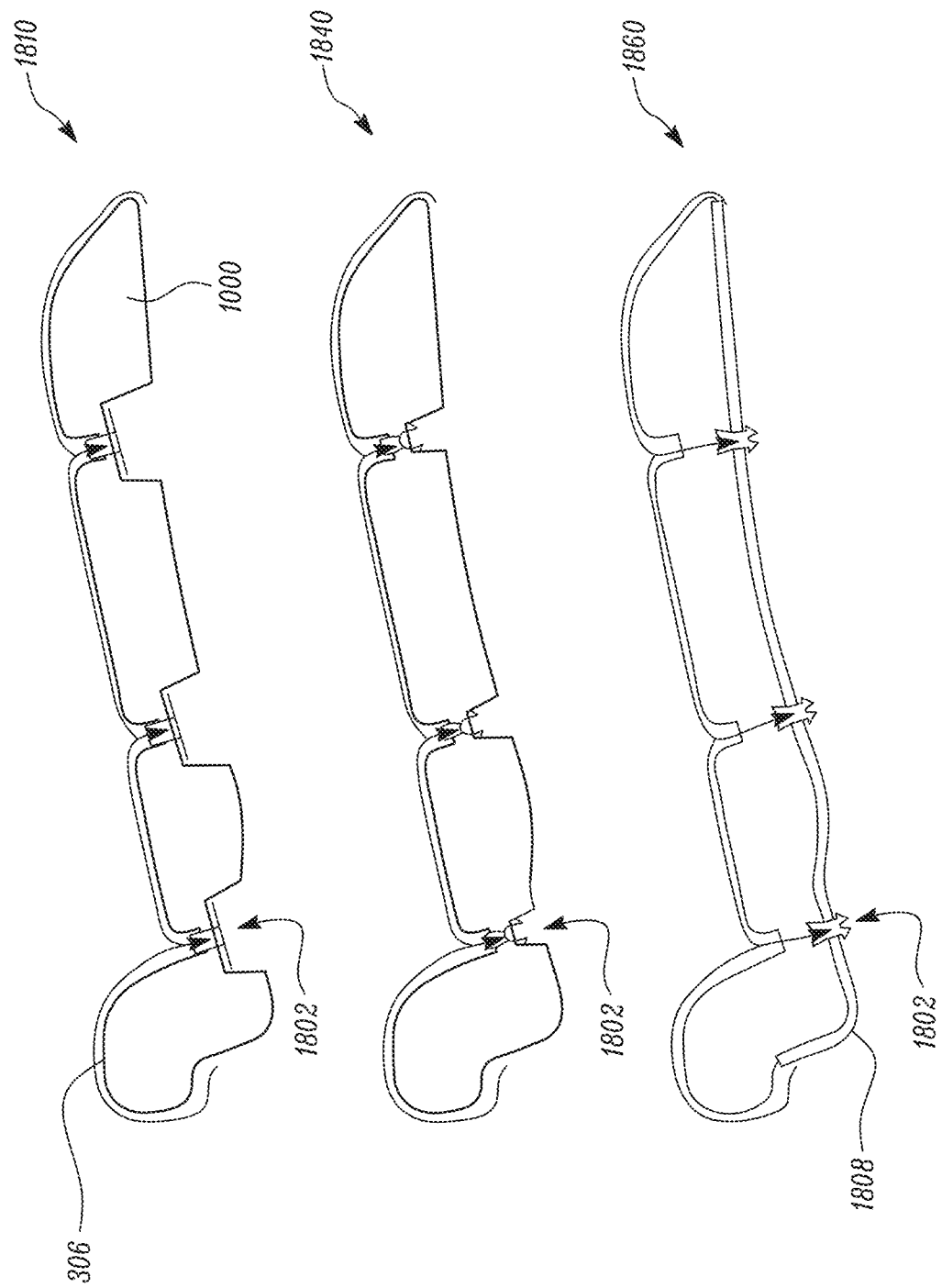
FIG. 18 illustrates cross-sectional views of different mechanical clips that can be used to attach a sewn trim cover to a fibrous foam bun.

For mechanical attachment of trim cover to fibrous volume, the fibrous foam architecture may include clips of various designs, for example the types shown in FIG. 18. In example 1810, clips 1802 are inserted through fibrous bun 1000 from bottom side for attachment to trim cover 306. In example 1840, clips 1802 are first attached to trim cover 306 then inserted through fibrous bun 1000 from top side. In example 1860, clips 1802 are first attached to trim cover 306 then inserted through fibrous bun 1000 and bottom substrate 1808.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed fibrous foam architecture. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A cushion having a fibrous foam architecture, the cushion comprising:
   a trim cover;
   a fibrous volume attached to the trim cover, wherein the fibrous volume comprises a plurality of fibrous layers; and
   wherein at least one individual fibrous layer comprises a plurality of stacking fibrous sheets,
   wherein one or more structural properties of the at least one individual fibrous layer is defined by at least one of a number or pitch of the plurality of stacking fibrous sheets that make up the individual fibrous layer, and wherein individual stacking fibrous sheets are formed of substantially a same type of fibers or a same blend of fibers.

2. The cushion of claim 1, wherein the one or more structural properties of the at least one fibrous layer include any of a porosity or a density or a composition of the fibrous layer.

3. The cushion of claim 1, wherein a contacting fibrous layer of the fibrous volume has an open porosity, such that the contacting fibrous layer is configured to contact an external load.

4. The cushion of claim 3, wherein non-contacting fibrous layers of the fibrous volume have a controlled less open porosity.

5. The cushion of claim 1 further including a backing provided in contact with the fibrous volume.

6. The cushion of claim 1 further including any of a shearing pad or a backing layer provided in contact with the fibrous volume.

7. The cushion of claim 1, wherein the trim cover includes a trim insert and a heating/sensing layer.

8. The cushion of claim 1, wherein the plurality of fibrous sheets are formed in wave-like structure, and wherein the plurality of fibrous sheets has one or more different pitches.

9. The cushion of claim 8, wherein the plurality of fibrous sheets formed in wave-like structure cross-link one another.

10. The cushion of claim 1, wherein at least a portion of fibers in the fibrous volume are primarily oriented normal to a surface of the trim cover.

11. The cushion of claim 1, wherein the trim cover is attached to the fibrous volume by any of:
 a clip inserted through the fibrous volume from side opposite to the trim cover; or
 a clip pre-attached to the trim cover then inserted through the fibrous volume to anchor onto the fibrous volume; or
 a clip pre-attached to the trim cover then inserted through the fibrous volume to anchor onto a substrate on opposite side to the trim cover.

12. The cushion of claim 1, wherein the at least one individual fibrous layer is configured to have a lower porosity, and wherein the lower porosity is defined by a higher pitch of the stacking fibrous sheets.

13. The cushion of claim 1, wherein the at least one individual fibrous layer is configured to have a higher porosity, and wherein the higher porosity is defined by a lower pitch of the stacking fibrous sheets.

14. The cushion of claim 1, wherein the at least one individual fibrous layer is configured to have at least one region of higher porosity and at least one region of lower porosity, and wherein the different porosities are defined by varying the pitches of the stacking fibrous sheets at different regions.

15. A fibrous foam architecture comprising:
 a plurality of fibrous layers, wherein at least one individual fibrous layer comprises a plurality of stacking fibrous sheets, such that porosity of the at least one individual fibrous layer is defined by at least one of a number or pitch of the plurality of stacking fibrous sheets that make up the individual fibrous layer to differ from that of another individual fibrous layer to impact a feel of the fibrous foam architecture, and
 wherein individual stacking fibrous sheets are formed of substantially a same type of fibers or a same blend of fibers.

16. The fibrous foam architecture of claim 15, wherein a contacting fibrous layer has an open porosity, such that the contacting fibrous layer is configured to contact an external load.

17. The fibrous foam architecture of claim 16, wherein other non-contacting fibrous layers have a controlled less open porosity.

18. The fibrous foam architecture of claim 15, wherein the each of the plurality of fibrous layers are bonded together to form the fibrous foam architecture by compression molding such that the fibrous foam architecture has different densities associated with one or more of the plurality of fibrous layers.

19. The cushion of claim 15, wherein the plurality of fibrous sheets are formed in wave-like structure, and wherein the plurality of fibrous sheets has one or more different pitches.

20. The cushion of claim 19, wherein the plurality of fibrous sheets formed in wave-like structure cross-link one another.

* * * * *